US011466041B2

(12) United States Patent
Yacovan et al.

(10) Patent No.: US 11,466,041 B2
(45) Date of Patent: Oct. 11, 2022

(54) PROCESS FOR PREPARING METHYL PHOSPHINIC ACID BUTYL ESTER

(71) Applicants: Avihai Yacovan, Mazkeret Batya (IL); Alexander Shterenberg, Rehovot (IL); Leonid Erchov, Beit Shemesh (IL); Sveta Fronton, Modi'in (IL); Gerd-Volker Roeschenthaler, Bremen (DE); Mykhailo Shevchuk, Bremen (DE); Olesya Stubbmann-Kazakova, Bassum (DE); Nataliya Kalinovich, Bremen (DE)

(72) Inventors: Avihai Yacovan, Mazkeret Batya (IL); Alexander Shterenberg, Rehovot (IL); Leonid Erchov, Beit Shemesh (IL); Sveta Fronton, Modi'in (IL); Gerd-Volker Roeschenthaler, Bremen (DE); Mykhailo Shevchuk, Bremen (DE); Olesya Stubbmann-Kazakova, Bassum (DE); Nataliya Kalinovich, Bremen (DE)

(73) Assignee: ADAMA AGAN LTD., Ashdod (IL)

( * ) Notice: Subject to any disclaimer, the term of this patent is extended or adjusted under 35 U.S.C. 154(b) by 0 days.

(21) Appl. No.: 16/487,646

(22) PCT Filed: Feb. 16, 2018

(86) PCT No.: PCT/IB2018/000222
§ 371 (c)(1),
(2) Date: Aug. 21, 2019

(87) PCT Pub. No.: WO2018/154385
PCT Pub. Date: Aug. 30, 2018

(65) Prior Publication Data
US 2019/0375771 A1    Dec. 12, 2019

Related U.S. Application Data

(60) Provisional application No. 62/462,113, filed on Feb. 22, 2017.

(51) Int. Cl.
*C07F 9/50* (2006.01)

(52) U.S. Cl.
CPC .................................. *C07F 9/5072* (2013.01)

(58) Field of Classification Search
None
See application file for complete search history.

(56) References Cited

U.S. PATENT DOCUMENTS

| 4,474,711 | A | 10/1984 | Kleiner |
| 5,420,329 | A | 5/1995 | Zeiss |
| 5,734,072 | A | 3/1998 | Kleiner |
| 6,815,558 | B1 | 11/2004 | Weferling |
| 9,035,083 | B2 | 5/2015 | Montchamp |
| 9,255,115 | B2* | 2/2016 | Nakanishi ............... C07F 9/301 |
| 2008/0319231 | A1* | 12/2008 | Nilsson ................ C07F 9/4816 568/15 |
| 2010/0063063 | A1* | 3/2010 | Benbow ............... C07D 403/12 514/255.05 |
| 2014/0303394 | A1 | 10/2014 | Montchamp |
| 2018/0265529 | A1* | 9/2018 | Ressel ................... C07F 9/3211 |
| 2019/0284215 | A1* | 9/2019 | Jiang ..................... C07F 9/5428 |

FOREIGN PATENT DOCUMENTS

| CN | 102351900 | 2/2012 |
| CN | 103435643 | 12/2013 |
| EP | 0370736 A2 | 3/1989 |
| WO | WO 2006031180 A1 | 3/2006 |

OTHER PUBLICATIONS

I. Abrunhosa-Thomas et al., Synthesis, 325-331 (2006) (Year: 2006).*
N.G. Anderson, Practical Process & Research Development, Solvent Selection 53-111 (2000) (Year: 2000).*
S. Deprèle et al., Journal of Organic Chemistry, 6745-6755 (2001) (Year: 2001).*
L. Garvara et al., 53 Tetrahedron Letters, 5000-5003 (2012) (Year: 2012).*
S. Deprele, Phosphorus-Carbon Bond Formation New Methodologies for Hydrophosphinylation Reactions (Doctoral Thesis, 2004) (Year: 2004).*
J. Montchamp et al., Journal of Organometallic Chemistry, 154-163 (2002) (Year: 2002).*
E. Nifant'ev J. Gen . Chem. USSR, 762 (1965) (Year: 1965).*
M. Gallagher et al., 61 Journal of Organic Chemistry, 436-437 (1996) (Year: 1996).*
M. Gallagher et al., 115 Phosphorus, Sulfur and Silicon and the Related Elements, 255-259 (1996) (Year: 1996).*
Laurent Gavara et al., "DBU-promoted alkylation of alkyl phosphinates and H-phosphonates", Tetrahedron Letters, vol. 53, No. 37, Jul. 16, 2012, pp. 5000-5003.
Michael J Gallagher and Gerbert Honegger, "Dialkoxymethylation of Phosphorus with Trialkyl Orthoformates: Reactions of Phosphonic and Phosphinic Acids via Their Trivalent Tautomers", Tetrahedron let, Elsevier, Amsterdam, NL, vol. 18, No. 34, Jan. 1, 1977, pp. 2987-2990.

(Continued)

*Primary Examiner* — Alexander R Pagano
(74) *Attorney, Agent, or Firm* — Gary J. Gershik

(57) ABSTRACT

The present subject matter provides a safe alternative for producing an important intermediate useful for preparing the herbicide glufosinate, without need for chlorine components in the manufacturing process. In particular, a process for preparing alkyl phosphinic aid alkyl ester is provided, including the step of alkylating alkyl phosphinic acid ester in a non-polar solvent in the same apparatus as used to first produce the alkyl phosphinic acid ester, and without isolating the alkyl phosphinic acid ester before the alkylation step is conducted. More specifically, a process is presented for preparing methyl phosphinic acid butyl ester, by alkylating butyl phosphinic acid ester in a non-polar solvent, in the same apparatus as used previously to first produce the butyl phosphinic acid ester and without isolating the butylphosphinic acid ester before alkylation.

15 Claims, No Drawings

(56) References Cited

OTHER PUBLICATIONS

Baillie A C et al., "Synthesis of Potential Inhibitors of the Enzyme Pantothenate Synthetase", Tetrahedron Let, Elsevier, Amsterdam, NL, vol. 33, No. 35, Aug. 25, 1992, pp. 5133-5136.
Genna Douglas T. et al., "Enantioselective Synthesis of L Phosphinothricin From L Methionine and L Glutamic Acid via L Vinylglycine", Tetrahedron, Elsevier Science Publishers, Amsterdam, NL, vol. 48, No. 38, Jan. 1, 1992, pp. 8263-8270.
International Search Report dated Jun. 6, 2018 in connection with PCT International Application No. PCT/IB2018/000222.
Written Opinion of the International Searching Authority dated Jun. 6, 2018 in connection with PCT International Application No. PCT/IB2017/001510.
Michael J. Gallagher et al., "Mono- and Dialkylation of Isopropyl Phosphinate—A Simple Preparation of Alkylphosphinate Esters", Phosphorus, Sulfur and Silicon and the Related Elements, Taylor & Francis Inc., vol. 115, No. 1, Jan. 1, 1996, pp. 225-259.
Froestl W. et al., "Phosphinic Acid Analogues of GABA. 2. Selective, Orally Actibe GABAB Antagonists", Journal of Medical Chemistry, American Chemical Society, vol. 38, No. 17, Jan. 1, 1995, pp. 3313-3331.
Gallagher M. J et al., "Organophosphorus Intermediates. VI The Acid-Catalysed Reaction of Trialkyl Orthoformates with Phosphinic Acid", Australian Journal of Chemistry Sci, CSIRO Publishing, AU, vol. 33, Jan. 1, 1980, pp. 287-294.
Cécile Fougère et al., "Rapid and Efficient Synthesis of Unsymmetrical Phosphinic Acids R' P (O) OHR" : Synthesis of Unsymmetrical Phosphinic Acids R' P (O) OHRΔ", European Journal of Organic Chemistry, vol. 2009, No. 34, Dec. 1, 2009, pp. 6048-6054.
Sylvine Deprèle et al, A Novel and Convenient Preparation of Hypophosphite Esters, Journal of Organometallic Chemistry vols. 643-644, Feb. 1, 2002, pp. 154-163.
Isabelle Abrunhosa-Thomas, Alkylation of H-Phosphinate Esters under Basic Conditions, J. Org. Chem. 2007, 72, 8, 2851-2856, Mar. 13, 2007.
International Preliminary Report on Patentability dated Aug. 27, 2019 in connection with PCT International Application No. PCT/IB2018/000222.
Michael J. Gallagher, Millagahamada G. Ranasinghe & Ian D. Jenkins (1996) Mono- and Dialkylation of Isopropyl Phosphinate—A Simple Preparation of Alkylphosphinate Esters1 , Phosphorus, Sulfur, and Silicon and the Related Elements, 115:1,255-259, DOI: 10.1080/10426509608037971.
Feb. 18, 2022 Office Action issued in connection with Argentinian Patent Application No. 20180100405.
Fougere, C. et al., "Rapid and Efficient Synthesis of Unsymmetrical Phosphinic Acids R'P(O)OHR'"". Eur. J. Org. Chem., 2009, pp. 6048-6054.
Gallagher, M.J. and Honegger, H., "Dialkoxymethylation of Phosphorus With Trialkyl Orthoformates: Reactions of Phosphonic and Phosphinic Acids via Their Trivalent Tautomers". Tetrahedron Letters, 1977, vol. 34, pp. 2987-2990.
Lamoureux, G. and Agüero, C., "A comparison of several modern alkylating agents". Arkivoc, 2009, 251-264.
Mąkosza M. and Fedoryński, M. "Phase Transfer Catalysis". Catalysis Reviews, 2003, 45(3-4), pp. 321-367.
Representation for Opposition to Grant of Patent under Section 25(1) of the Patents Act, 1970 Against Patent Application No. 201937030995 dated Jul. 31, 2019.
Zeiss, H., "Enantioselective Synthesis of L-Phosphinothricin from L-Methionine and L-Glutamic Acid via L-Vinylglycine". Tetrahedron, 1992, vol. 48(38), pp. 8263-8270.

\* cited by examiner

PROCESS FOR PREPARING METHYL PHOSPHINIC ACID BUTYL ESTER

CROSS-REFERENCE TO RELATED APPLICATIONS

This application is a § 371 national stage of PCT International Application No. PCT/IB2018/000222, filed Feb. 16, 2018, and claims the benefit of U.S. Provisional Application No. 62/462,113, filed Feb. 22, 2017, the contents of each of which are hereby incorporated by reference.

Throughout this application various publications are referenced. The disclosures of these documents in their entireties are hereby incorporated by reference into this application in order to more fully describe the state of the art to which this invention pertains.

TECHNICAL FIELD

The present subject matter relates to a process for preparing and using an alkyl phosphinic acid alkyl ester, an intermediate useful for preparing the herbicide glufosinate. One such process includes preparing and then alkylating the alkyl phosphinic acid ester in a non-polar solvent, without isolating the alkyl phosphinic acid ester prior to the alkylation step. In particular, the present subject matter provides a process for preparation of methyl phosphinic acid butyl ester by preparing and then alkylating butyl phosphinic acid ester in a non-polar solvent, without isolating the butyl phosphinic acid ester.

BACKGROUND

Glufosinate is a broad-spectrum systemic herbicide produced that function as Glutamine synthetase inhibitor which leads to accumulation of ammonium ions, and inhibition of photosynthesis.

The compound methyl phosphinic acid alkyl ester of formula (I)

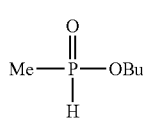

(I)

is an important intermediate for preparing the herbicidal active ingredient Glufosinate, RS)-2-Amino-4-(hydroxy (methyl)phosphonoyl)butanoic acid, as described in U.S. Pat. Nos. 5,420,329 and 4,168,963.

Different manufacturing processes are known in the literature.

U.S. Pat. No. 5,734,072 describes preparing monoalkyl phosphinate from dichlorophosphines.

U.S. Pat. No. 9,035,083 describes a method for producing H-phosphonates while avoiding the use of chlorine. The method comprises the steps of: reacting hypophosphorous acid with an alcohol to produce a phosphinate and an excess of alcohol; and then reacting the phosphinate in the presence of the excess alcohol with a metal catalyst to produce an H-phosphonate.

CN102351900 describes a method for synthesizing monoalkyl phosphonate. The method is characterized in that alkyl phosphine dihalide is taken as a raw material that is subjected to a hydrolysis reaction to obtain alkyl phosphinic acid. The alkyl phosphinic acid undergoes a dehydrated esterification reaction with a compound possessing a structure of $R_2$—OH to obtain the alkyl phosphonate, wherein $R_2$ is alkyl, nonsaturated alkylene, or aryl. The process route for preparing a halogen hydride by-product or its aqueous solution can be used as a normal industrialization production process. The esterification process reaction takes place under mild conditions and without requiring complex equipment, keeping the production cost low.

CN103435643 describes a preparation method of a monohydroxy dialkyl phosphinic acid metal salt fire retardant. The preparation method includes the step of reacting alkyl phosphonium dichloride and alcohol to obtain monoalkyl phosphonate.

U.S. Pat. No. 6,815,558 describes a preparation of (metal) salts of alkylphosphonous acids, comprising reaction of elemental yellow phosphorus with alkyl halides in the presence of a base selected from carbonates, bicarbonates, amides, alcoholates, amino bases and/or solid hydroxides.

U.S. Pat. No. 6,806,383 describes a process for the preparation of (metal) salts of alkylphosphonous acids, which comprises reacting elemental yellow phosphorus with halogen-free alkylating agents in the presence of at least one base. Also discussed is the use of the (metal) salts of alkylphosphonous acids prepared by this process.

However, there was a need to develop synthetic pathways where the reaction starts with commercial, easily handled material, in a process that is highly efficient, low-cost, and environmentally friendly. These advantages are not exhibited by prior art processes. The present subject matter provides such a process.

It is therefore a purpose of the present subject matter to provide a process that overcomes the disadvantages of the known art.

SUMMARY

The present invention provides a process for preparing the compound of the formula (II)

(II)

wherein

R is a $C_1$-$C_6$ alkyl or benzyl, and $R_1$ is $C_1$-$C_6$ alkyl comprising reacting in a non-polar solvent the compound of formula (I)

(I)

wherein

R is $C_1$-$C_6$ alkyl or benzyl, with an alkylating agent in the presence of base.

The present invention also provides a process for preparing the compound of the formula (II)

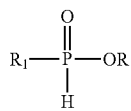

(II)

wherein
R is $C_1$-$C_6$ alkyl or benzyl, and
$R_1$ is $C_1$-$C_6$ alkyl,
comprising the steps of:
(a) reacting hypophosphorous acid with a $C_1$-$C_6$ alkyl or benzyl alcohol in the presence of an acid under dehydrating conditions to give the compound of the formula (I),

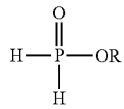

(I)

wherein
R is $C_1$-$C_6$ alkyl or benzyl; and
(b) reacting the compound of formula (I) obtained in step (a) with an alkylating agent in the presence of a base,
wherein each step is carried out in the same pot in a non-polar solvent, and wherein the product of step (a) is neither purified nor isolated prior to step (b).

The present invention further provides a process for preparing the compound of the formula (II)

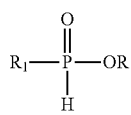

(II)

wherein
R is $C_1$-$C_6$ alkyl or benzyl, and $R_1$ is $C_1$-$C_6$ alkyl, comprising the steps of:
(a) reacting hypophosphorous acid with a $C_1$-$C_6$ alkyl or benzyl alcohol in the presence of an acid under dehydrating conditions in a non-polar solvent to obtain the compound of formula (I)

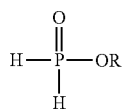

(I)

wherein R is $C_1$-$C_6$ alkyl or benzyl;
(b) reacting the compound obtained in step (a) with a trialkyl orthoformate to obtain the compound of formula (IIIa):

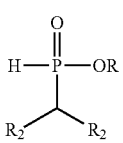

(IIIa)

c) reacting the compound obtained in step (b) with an alkylating agent in the presence of a base to obtain a compound of formula (IIIb):

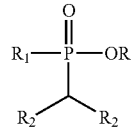

(IIIb)

wherein R is $C_1$-$C_6$ alkyl or benzyl; $R_1$ is $C_1$-$C_6$ alkyl; and $R_2$ is O-alkyl;
(d) reacting the compound obtained in step (c) with an acid to obtain a compound of formula (IV):

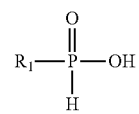

(IV)

wherein $R_1$ is $C_1$-$C_6$ alkyl;
(e) reacting the compound obtained in step (d) with an alkyl alcohol in the presence of an acid under dehydrating conditions in a non-polar solvent to obtain the compound of formula (II).

The present invention yet further provides a process for preparing compound of the formula (II):

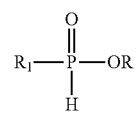

(II)

wherein
R is $C_1$-$C_6$ alkyl or benzyl, and $R_1$ is $C_1$-$C_6$ alkyl, comprising the steps of:
(a) reacting hypophosphorous acid with a trialkyl orthoformate to obtain the compound of formula (IIIc):

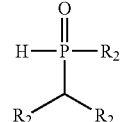

(IIIc)

wherein each $R_2$ is O-alkyl;
(b) reacting the compound obtained in step (a) with an alkylating agent in the presence of a base to obtain the compound of formula (IIId):

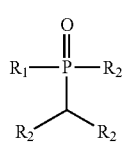

(IIId)

wherein $R_1$ is $C_1$-$C_6$ alkyl or benzyl; and each $R_2$ is O-alkyl;
(c) reacting the compound obtained in step (b) with an acid to obtain the compound of formula (IV):

wherein $R_1$ is $C_1$-$C_6$ alkyl;
(d) reacting the compound obtained in step (c) with a $C_1$-$C_6$ alkyl alcohol or benzyl alcohol in the presence of an acid under dehydrating conditions in a non-polar solvent to obtain the compound of formula (IV).

The present invention also provides a process for preparing the compound of the formula (II)

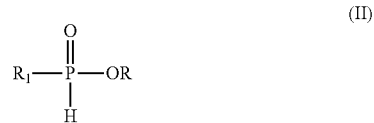

wherein
R is $C_1$-$C_6$ alkyl or benzyl, and $R_1$ is $C_1$-$C_6$ alkyl, comprising the steps of:
(a) reacting hypophosphorous acid with a $C_1$-$C_6$ alkyl or benzyl alcohol in the presence of an acid under dehydrating conditions to obtain the compound of formula (I)

wherein
R is $C_1$-$C_6$ alkyl or benzyl; and
(b) reacting the compound obtained din step (a) with an alkylating agent in the presence of a base to give the compound of formula (II).

DETAILED DESCRIPTION

Definitions

Prior to setting forth the present subject matter in detail, it may be helpful to provide definitions of certain terms to be used herein. Unless defined otherwise, all technical and scientific terms used herein have the same meaning as is commonly understood by one of skill in the art to which this subject matter pertains.

As used herein, the term "mixture" or "combination" refers, but is not limited, to a combination in any physical form, e.g., blend, solution, alloy, or the like.

The term "a" or "an" as used herein includes the singular and the plural, unless specifically stated otherwise. Therefore, the terms "a," "an," or "at least one" can be used interchangeably in this application. Throughout the application, descriptions of various embodiments use the term "comprising"; however, it will be understood by one of skill in the art, that in some specific instances, an embodiment can alternatively be described using the language "consisting essentially of" or "consisting of." In each such instance, the terms "comprising," "consisting essentially of," and "consisting of" are intended to have the same meaning as each such term would have when used as the transition phrase of a patent claim.

For purposes of better understanding the present teachings and in no way limiting the scope of the teachings, unless otherwise indicated, all numbers expressing quantities, percentages, or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques. In this regard, used of the term "about" herein specifically includes ±10% from the indicated values in the range. In addition, the endpoints of all ranges directed to the same component or property herein are inclusive of the endpoints, are independently combinable, and include all intermediate points and ranges.

Hypophosphite esters (ROP(O)$H_2$) are highly sensitive to moisture, air or heat and have a propensity for disproportionation and decomposition.

The present process is advantageous in that it is highly efficient, providing a short reaction time, reduced cost of production, and simplified work-up, minimizing related effluent disposal problems.

The present process is advantageous in that the process is carried out in a water-diluted solution.

The present invention provides a process for preparing the compound of the formula (II)

wherein
R is a $C_1$-$C_6$ alkyl or benzyl, and $R_1$ is $C_1$-$C_6$ alkyl comprising reacting in a non-polar solvent the compound of formula (I)

wherein
R is $C_1$-$C_6$ alkyl or benzyl,
with an alkylating agent in the presence of base.

In some embodiments, the process wherein the compound of formula (I) was prepared in the same non-polar solvent and without being isolated from the non-polar solvent prior to reacting with the alkylating agent in the presence of base.

In some embodiments, the process wherein the alkylation reaction is conducted in the same pot and in the same non-polar solvent as the reaction that prepare the compound of formula (I).

In some embodiments, the process wherein R is methyl or n-butyl. In some embodiments, the process wherein $R_1$ is methyl.

In some embodiments, the process wherein the non-polar solvent is toluene.

In some embodiments, the process wherein the alkylating agent is a methylating agent. In some embodiments, the process wherein the methylating agent is dimethyl sulfate.

In some embodiments, the process wherein the base is one or more selected from the group comprising sodium methoxide, sodium hydride, and diisobutyl amide salt.

In some embodiments, the process wherein the base is sodium methoxide.

In some embodiments, the process wherein the alkylation is performed in the presence of a transfer agent.

In some embodiments, the process wherein the phase transfer agent is $Bu_4NX$, $MeNBu_3X$, Aliquat® 336, $Oct_4NX$, $Oct_3NMeX$, $Me_4NX$, or $Ph_4PX$, wherein X=Cl, Br, I, or $HSO_4$.

In some embodiments, the process wherein the alkylation is performed in the presence of a chelating agent.

In some embodiments, the process wherein the chelating agent is 18-crown-6, 15-crown-5, 12-crown-4 or PEG-400.

In some embodiments, the process wherein the compound produced has the structure

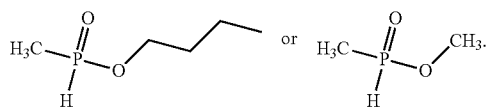

The present invention also provides a process for preparing the compound of the formula (II)

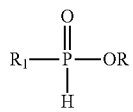

wherein
R is $C_1$-$C_6$ alkyl or benzyl, and
$R_1$ is $C_1$-$C_6$ alkyl,
comprising the steps of:
(a) reacting hypophosphorous acid with a $C_1$-$C_6$ alkyl or benzyl alcohol in the presence of an acid under dehydrating conditions to give the compound of the formula (I),

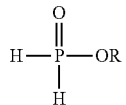

wherein
R is $C_1$-$C_6$ alkyl or benzyl; and
(b) reacting the compound of formula (I) obtained in step (a) with an alkylating agent in the presence of a base, wherein each step is carried out in the same pot in a non-polar solvent, and wherein the product of step (a) is neither purified nor isolated prior to step (b).

In some embodiments, the process wherein R is methyl or n-butyl. In some embodiments, the process wherein $R_1$ is methyl.

In some embodiments, the process wherein the non-polar solvent is toluene.

In some embodiments, the process wherein the acid is sulfuric acid.

In some embodiments, the process wherein the alkylating agent is a methylating agent. In some embodiments, the process wherein the methylating agent is dimethyl sulfate.

In some embodiments, the process wherein the base is one or more selected from the group comprising sodium methoxide, sodium hydride, and diisobutyl amide salt.

In some embodiments, the process wherein the base is sodium methoxide.

In some embodiments, the process wherein in step (a) the dehydrating conditions comprise heating, the presence of a water scavenger, or both.

In some embodiments, the process wherein the water scavenger is calcium chloride, sodium sulfate, calcium sulfate, magnesium sulfate or molecular sieves.

In some embodiments, the process wherein step (a) is performed at reflux under Dean-Stark conditions.

In some embodiments, the process wherein step (b) is performed in the presence of a phase transfer agent.

In some embodiments, the process wherein the phase transfer agent is $Bu_4NX$, $MeNBu_3X$, Aliquat® 336, $Oct_4NX$, $Oct_3NMeX$, $Me_4NX$, or $Ph_4PX$, wherein X=Cl, Br, I, or $HSO_4$.

In some embodiments, the process wherein step (b) is performed in the presence of a chelating agent.

In some embodiments, the process wherein the chelating agent is 18-crown-6, 15-crown-5, 12-crown-4 or PEG-400.

In some embodiments, the process wherein the compound produced has the structure

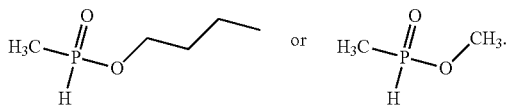

In some embodiments, a process for preparing the compound of the formula (IIa):

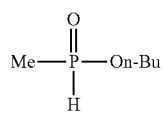

comprising the steps of:
(a) reacting a water solution of hypophosphorous acid with n-butyl alcohol in the presence of sulfuric acid under dehydrating conditions to obtain the compound of the formula (Ia)

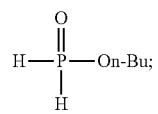

and
(b) reacting the compound obtained in step (a) with dimethyl sulfate in the presence of sodium methoxide, wherein each step is carried out in toluene, and wherein the product of step (a) is neither purified nor isolated prior to step (b).

In some embodiments, a process for preparing the compound of the formula (IIb):

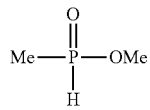
(IIb)

comprising the steps of:
(a) reacting a water solution of hypophosphorous acid with methyl alcohol in the presence of sulfuric acid under dehydrating conditions to obtain the compound of the formula (Ib)

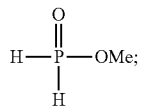
(Ib)

and
(b) reacting the compound obtained in step (a) with dimethyl sulfate in the presence of sodium methoxide,
wherein each step is carried out in toluene, and wherein the product of step (a) is neither purified nor isolated prior to step (b).

In a process for preparing glufosinate which comprises converting the compound of the formula (I)

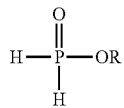
(I)

to the compound of the formula (II):

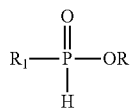
(II)

wherein R is $C_1$-$C_6$ alkyl or benzyl and $R_1$ is methyl, the improvement comprising converting the compound of the formula (I) to the compound of formula (II) by the process of any one of claims 1-15.

In some embodiments, a process for preparing glufosinate which comprises converting the compound of the formula (I)

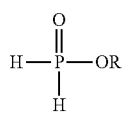
(I)

to the compound of the formula (II):

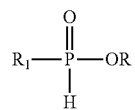
(II)

wherein R is $C_1$-$C_6$ alkyl or benzyl and $R_1$ is methyl, by the process of the present invention.

In some embodiments of the above process, further comprising:
(b) converting the compound of formula (II) to glufosinate.

In some embodiments of the above process, further comprising:
(b) reacting the compound of formula (II) with a compound having the structure:

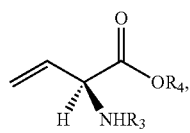

wherein $R_3$ is an amine protecting group and $R_4$ is a carboxylic acid protecting group, to obtain a compound having the structure:

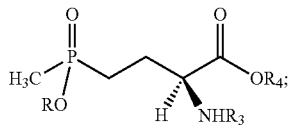

and
(c) deprotecting the $R_3$ amine protecting group, deprotecting the $R_4$ carboxylic acid protecting group and hydrolyzing the $C_1$-$C_6$ alkyl or benzyl R group of the compound obtained in step (b) to produce glufosinate.

In a process for preparing glufosinate which comprises converting hypophosphorous acid to the compound of the formula (II):

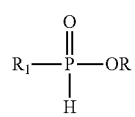
(II)

wherein R is $C_1$-$C_6$ alkyl or benzyl and $R_1$ is methyl, the improvement comprising converting the hypophosphorous acid to the compound of formula (II) by the process of the present invention.

A process for preparing glufosinate which comprises converting hypophosphorous acid to the compound of the formula (II):

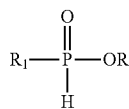

wherein R is $C_1$-$C_6$ alkyl or benzyl and $R_1$ is methyl, by the process of the present invention.

In some embodiments of the above process, further comprising:
(b) converting the compound of formula (II) to glufosinate.

In some embodiments of the above process, further comprising:
(b) reacting the compound of formula (II) with a compound having the structure:

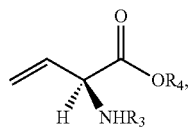

wherein $R_3$ is an amine protecting group and $R_4$ is a carboxylic acid protecting group, to obtain a compound having the structure:

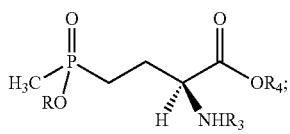

and
(c) deprotecting the $R_3$ amine protecting group, deprotecting the $R_4$ carboxylic acid protecting group and hydrolyzing the $C_1$-$C_6$ alkyl or benzyl R group of the compound obtained in step (b) to produce glufosinate.

The present invention further provides a process for preparing the compound of the formula (II)

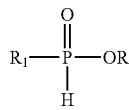

wherein
R is $C_1$-$C_6$ alkyl or benzyl, and $R_1$ is $C_1$-$C_6$ alkyl, comprising the steps of:
(a) reacting hypophosphorous acid with a $C_1$-$C_6$ alkyl or benzyl alcohol in the presence of an acid under dehydrating conditions in a non-polar solvent to obtain the compound of formula (I)

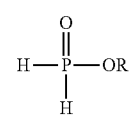

wherein R is $C_1$-$C_6$ alkyl or benzyl;

(b) reacting the compound obtained in step (a) with a trialkyl orthoformate to obtain the compound of formula IIIa):

wherein $R_2$ is O-alkyl;
(c) reacting the compound obtained in step (b) with an alkylating agent in the presence of a base to obtain a compound of formula (IIIb):

wherein R is $C_1$-$C_6$ alkyl or benzyl; $R_1$ is $C_1$-$C_6$ alkyl; and $R_2$ is O-alkyl;
(d) reacting the compound obtained in step (c) with an acid to obtain a compound of formula (IV):

wherein $R_1$ is $C_1$-$C_6$ alkyl;
(e) reacting the compound obtained in step (d) with an alkyl alcohol in the presence of an acid under dehydrating conditions in a non-polar solvent to obtain the compound of formula (V).

In some embodiments, the process wherein R is methyl or n-butyl. In some embodiment, the process wherein $R_1$ is methyl.

In some embodiments, the process wherein the non-polar solvent in step (a) and/or step (e) is toluene.

In some embodiments, the process wherein the acid in step (a) and/or step (e) is sulfuric acid.

In some embodiments, the process wherein the alkylating agent in step (c) is dimethyl sulfate or methyl chloride.

In some embodiments, the process wherein the base in step (c) is one or more selected from the group comprising sodium methoxide, sodium hydride, and diisobutyl amide salt.

In some embodiments, the process wherein the base in step (c) is sodium methoxide.

In some embodiments, the process wherein in step (a) and/or step (e) the dehydrating conditions comprise heating, the presence of a water scavenger, or both.

In some embodiments, the process wherein the water scavenger is calcium chloride, sodium sulfate, calcium sulfate, magnesium sulfate or molecular sieves.

In some embodiments, the process wherein in step (a) and/or step (e) is performed at reflux under Dean-Stark conditions.

In some embodiments, the process wherein in step (b) the trialkylorthoformate is trimethylorthoformate or triethylorthoformate.

In some embodiments, the process wherein step (c) is conducted in a polar solvent.

In some embodiments, the process wherein the polar solvent is tetrahydrofuran.

In some embodiments, the process wherein step (c) is performed in the presence of a phase transfer agent.

In some embodiments, the process wherein the phase transfer agent is $Bu_4NX$, $MeNBu_3X$, Aliquat® 336, $Oct_4NX$, $Oct_3NMeX$, $Me_4NX$, or $Ph_4PX$, wherein X=Cl, Br, I, or $HSO_4$.

In some embodiments, the process wherein step (c) is performed in the presence of a chelating agent.

In some embodiments, the process wherein the chelating agent is 18-crown-6, 15-crown-5, 12-crown-4 or PEG-400.

In some embodiments, the process wherein the compound produced has the structure

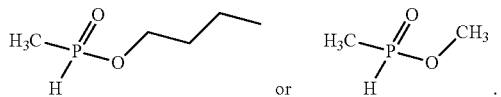

or

The present invention yet further provides a process for preparing compound of the formula (II):

(II)

wherein
R is $C_1$-$C_6$ alkyl or benzyl, and $R_1$ is $C_1$-$C_6$ alkyl, comprising the steps of:
(a) reacting hypophosphorous acid with a trialkyl orthoformate to obtain the compound of formula (IIIc):

(IIIc)

wherein each $R_2$ is O-alkyl;
(b) reacting the compound obtained in step (a) with an alkylating agent in the presence of a base to obtain the compound of formula (IIId):

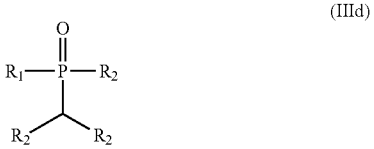
(IIId)

wherein $R_1$ is $C_1$-$C_6$ alkyl or benzyl; and each $R_2$ is O-alkyl;
(c) reacting the compound obtained in step (b) with an acid to obtain the compound of formula (IV):

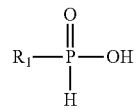
(IV)

wherein $R_1$ is $C_1$-$C_6$ alkyl;
(d) reacting the compound obtained in step (c) with a $C_1$-$C_6$ alkyl alcohol or benzyl alcohol in the presence of an acid under dehydrating conditions in a non-polar solvent to obtain the compound of formula (IV).

In some embodiments, the process wherein R is methyl or n-butyl. In some embodiment, the process wherein $R_1$ is methyl.

In some embodiments, the process wherein in step (a) the trialkylorthoformate is trimethylorthoformate or triethylorthoformate.

In some embodiments, the process wherein the base in step (b) is one or more selected from the group comprising sodium methoxide, sodium hydride, and diisobutyl amide salt.

In some embodiments, the process wherein the alkylating agent in step (b) is dimethyl sulfate.

In some embodiments, the process wherein step (b) is conducted in a non-polar solvent.

In some embodiments, the process wherein the non-polar solvent is toluene.

In some embodiments, the process wherein the alkylating agent in step (b) is methyl chloride.

In some embodiments, the process wherein step (b) is conducted in a polar solvent.

In some embodiments, the process wherein the polar solvent is tetrahydrofuran.

In some embodiments, the process wherein step (b) is performed in the presence of a phase transfer agent.

In some embodiments, the process wherein the phase transfer agent is $Bu_4NX$, $MeNBu_3X$, Aliquat® 336, $Oct_4NX$, $Oct_3NMeX$, $Me_4NX$, or $Ph_4PX$, wherein X=Cl, Br, I, or $HSO_4$.

In some embodiments, the process wherein step (b) is performed in the presence of a chelating agent.

In some embodiments, the process wherein the chelating agent is 18-crown-6, 15-crown-5, 12-crown-4 or PEG-400.

In some embodiments, the process wherein the acid in step (d) is sulfuric acid.

In some embodiments, the process wherein the non-polar solvent in step (d) is toluene.

In some embodiments, the process wherein in step (d) the dehydrating conditions comprise heating, the presence of water scavenger, or both.

In some embodiments, the process wherein the water scavenger is calcium chloride, sodium sulfate, calcium sulfate, magnesium sulfate or molecular sieves.

In some embodiments, the process wherein step (d) is performed at reflux under Dean-Stark conditions.

In some embodiments, the process wherein the compound produced has the structure

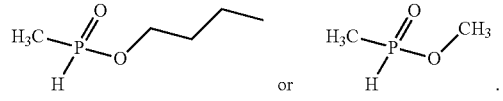

or

The present invention also provides a process for preparing the compound of the formula (II)

$$R_1-\overset{\overset{O}{\|}}{\underset{H}{P}}-OR \quad (II)$$

wherein
R is $C_1$-$C_6$ alkyl or benzyl, and $R_1$ is $C_1$-$C_6$ alkyl, comprising the steps of:
(a) reacting hypophosphorous acid with a $C_1$-$C_6$ alkyl or benzyl alcohol in the presence of an acid under dehydrating conditions to obtain the compound of formula (I)

$$H-\overset{\overset{O}{\|}}{\underset{H}{P}}-OR \quad (I)$$

wherein
R is $C_1$-$C_6$ alkyl or benzyl; and
(b) reacting the compound obtained din step (a) with an alkylating agent in the presence of a base to give the compound of formula (II).

In some embodiments, the process wherein R is methyl or n-butyl. In some embodiments, the process wherein $R_1$ is methyl.

In some embodiments, the process wherein the solvent in step (a) is a non-polar solvent.

In some embodiments, the process wherein the non-polar solvent is toluene.

In some embodiments, the process wherein the acid in step (a) is sulfuric acid.

In some embodiments, the process wherein in step (b) the alkylating agent is a methylating agent.

In some embodiments, the process wherein the alkylating agent in step (b) is dimethyl sulfate.

In some embodiments, the process wherein step (b) is conducted in a non-polar solvent.

In some embodiments, the process wherein the non-polar solvent is toluene.

In some embodiments, the process wherein the alkylating agent is methyl chloride.

In some embodiments, the process wherein step (b) is conducted in a polar solvent.

In some embodiments, the process wherein the polar solvent is tetrahydrofuran.

In some embodiments, the process wherein in step (b) the base is one or more selected from the group comprising sodium methoxide, sodium hydride, and diisobutyl amide salt.

In some embodiments, the process wherein the base is sodium methoxide.

In some embodiments, the process wherein in step (a) the dehydrating conditions comprise heating, the presence of water scavenger, or both.

In some embodiments, the process wherein the water scavenger is calcium chloride, sodium sulfate, calcium sulfate, magnesium sulfate or molecular sieves.

In some embodiments, the process wherein step (a) is performed at reflux under Dean-Stark conditions.

In some embodiments, the process wherein step (b) is performed in the presence of a phase transfer agent.

In some embodiments, the process wherein the phase transfer agent is $Bu_4NX$, $MeNBu_3X$, Aliquat® 336, $Oct_4NX$, $Oct_3NMeX$, $Me_4NX$, or $Ph_4PX$, wherein X=Cl, Br, I, or $HSO_4$.

In some embodiments, the process wherein step (b) is performed in the presence of a chelating agent.

In some embodiments, the process wherein the chelating agent is 18-crown-6, 15-crown-5, 12-crown-4 or PEG-400.

In some embodiments, the process wherein the compound produced has the structure $$H_3C-\overset{\overset{O}{\|}}{\underset{H}{P}}-O\diagdown\diagup\diagdown \quad \text{or} \quad H_3C-\overset{\overset{O}{\|}}{\underset{H}{P}}-O-CH_3.$$

In a process for preparing glufosinate which comprises converting hypophosphorous acid to the compound of the formula (II):

$$R_1-\overset{\overset{O}{\|}}{\underset{H}{P}}-OR \quad (II)$$

wherein R is $C_1$-$C_6$ alkyl or benzyl and $R_1$ is methyl, the improvement comprising converting the hypophosphorous acid to the compound of formula (II) by the process of the present invention.

A process for preparing glufosinate which comprises converting hypophosphorous acid to the compound of the formula (II):

$$R_1-\overset{\overset{O}{\|}}{\underset{H}{P}}-OR \quad (II)$$

wherein R is $C_1$-$C_6$ alkyl or benzyl; and $R_1$ is methyl, by the process of the present invention.

In some embodiments of the above the process, further comprising:
(b) converting the compound of formula (II) to glufosinate.

In some embodiments of the above the process, further comprising:
(b) reacting the compound of formula (II) with a compound having the structure:

[structure: vinyl group attached to chiral carbon bearing H, $NHR_3$, and C(=O)$OR_4$]

wherein $R_3$ is an amine protecting group and $R_4$ is a carboxylic acid protecting group, to obtain a compound having the structure:

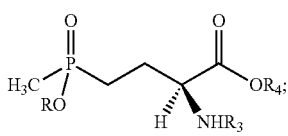

and (c) deprotecting the $R_3$ amine protecting group, deprotecting the $R_4$ carboxylic acid protecting group and hydrolyzing the $C_1$-$C_6$ alkyl or benzyl R group to produce glufosinate.

In one embodiment, the esterification step is conducted at a temperature from about 25° C. to about 50° C., more preferably from about 25° C. to about 35° C.

In one embodiment, the esterification reaction is conducted at a temperature from about 25° C. to about 50° C., more preferably from about 25° C. to about 35° C.

In one embodiment, the reaction of hypophosphorous acid with alcohol is conducted at a temperature from about 25° C. to about 50° C., more preferably from about 25° C. to about 35° C.

In one embodiment the present invention process comprises a step of protecting the hypophosphorous acid.

In one embodiment the present invention process comprises a step of protecting the hypophosphorous acid alkyl ester.

In one embodiment of the process wherein the esterification step immediately precedes the alkylation step, the alkylation reaction is carried out in the same solvent used in the esterification step.

In one embodiment of the process wherein the esterification step immediately precedes the alkylation step, the alkylation step is carried out in the same solvent used in the esterification step.

In one embodiment of the process wherein the esterification step immediately precedes the alkylation step, the reaction with alkylating agent is carried out in the same solvent used in the esterification step.

In one embodiment, the product which is obtained from the reaction of hypophosphorous acid with alcohol is not isolated before reacting with the alkylating agent.

In one embodiment the product which is obtained by the esterification reaction is not isolated before the alkylation reaction.

In some embodiment, the reaction with alkylating agent is carried out in the presence of a chelating agent.

In one embodiment the alkylation reaction is carried out in the presence of a chelating agent.

In some embodiments, the alkylation reaction is carried out in the presence of one or more phase transfer agents.

Alkylating agents used in any of the above disclosed processes include, but are not limited to, dimethylsulfate, halocarbons, iodomethane, chloromethane, bromomethane and an alkyl halide.

In one embodiment, the reaction with alkylating agent is carried out in the presence of a base. In one embodiment the alkylation reaction is carried out in the presence of a base.

In one embodiment the base comprises at least one organic basic, or at least one inorganic base.

Inorganic bases may include but not limited to sodium hydride, Na [sodium metal], NaOH, and $K_2CO_3$.

Organic bases may include but not limited to MeONa, MeONa/MeOH (30% solution), 4-dimethylaminopyridine (DMAP), diazabicyclo[2.2.2]octane (DABCO), 1,8-diazabicyclo[5.4.0]undec-7-ene (DBU), potassium tert-butoxide (t-BuOK), sodium tert-butoxide (t-BuONa), Pyridine, 2-Picoline, NaH, $Et_3N$, i-$Pr_2NEt$, alkyl-OMetal, KH, Alkyl Lithium, Alkyl MgX, $NaNH_2$, and lithium diisopropylamide (LDA).

In one embodiment, the reaction of hypophosphorous acid with alcohol is carried out in the presence of an acid.

In one embodiment the esterification process/step is carried out in the presence of an acid.

In one embodiment the acid comprises at least one organic acid, or at least one inorganic acid.

Inorganic acids may include but not limited to sulfuric acid, hydrochloric acid and hydrobromic acid.

Organic acid may include but not limited to trifluoroacetic acid, trifluoromethanesulfonic acid.

An exemplary chelating agent useful herein includes, without limitation, crown ethers.

Alkyl alcohol may include but not limited to, without limitation, one or more methanol, ethanol, propanol, isopropanol, butanolhexanol.

In one embodiment, the reaction of hypophosphorous acid with alcohol is reacted in an non polar solvent.

In one embodiment the esterification process/step is conducted in a non-polar solvent.

In one embodiment, the reaction of hypophosphorous acid with alcohol is reacted in the presence of a water dehydrating component.

In one embodiment the esterification process/step is conducted in the presence of a water dehydrating component.

In one embodiment the dehydrating component is an azeotrope of a non-polar solvent and water.

In one embodiment, the non-polar solvent may include, without limitation, one or more of the following: cyclohexane, xylene, benzene, toluene, methyl ethyl ketone, and methyl isobutyl ketone (MIBK).

In one embodiment, the water extracted from the reaction is collected in a Dean-Stark trap filled with excess toluene.

In one embodiment the water scavenger is a drying agent.

An example of drying agents useful herein includes, without limitation, calcium chloride ($CaCl_2$), sodium sulfate ($Na_2SO_4$), calcium sulfate ($CaSO_4$, also known as Drierite), magnesium sulfate ($MgSO_4$) or molecular sieves.

In one embodiment, the reaction of hypophosphorous acid with alcohol is carried out in a 90%, 80%, 70%, 60%, 50%, 40%, 30%, 20%, or 10% solution of hypophosphorous acid in water.

In one embodiment the esterification process/step is carried out in a 90%, 80%, 70%, 60%, 50%, 40%, 30%, 20%, or 10% solution of hypophosphorous acid in water.

In one embodiment, the esterification process/step is carried out with anhydrous hypophosphorous acid.

In one embodiment, the hypophosphorous acid is anhydrous form.

In one embodiment of any of the disclosed processes, the reaction of hypophosphorous, acid is a 90%, 80%, 70%, 60%, 50%, 40%, 30%, 20%, or 10% solution of hypophosphorous acid in water.

In one embodiment of any of the disclosed processes, the hypophosphorous acid is anhydrous form.

In one embodiment the non-polar solvent comprises toluene in the presence of a reagent for hydroxyl group protection.

In some embodiments, wherein the reaction with alkyl orthoformate is for protection of the hypophosphorous acid and/or the hypophosphorous alkyl ester.

Protecting groups may include but are not limited to alkyl orthoformate, alkyl orthoacetate, MeOH, EtOH, PrOH, i-PrOH, BuOH, i-BuOH, sec-BuOH, t-BuOH.

Protecting groups may include but are not limited to Me, Et, Pr, i-Pr, BuO, i-Bu, sec-Bu, t-Bu, or CH(OMe)$_2$.

In one embodiment, the reaction of hypophosphorous acid with the alkyl or benzyl alcohol is carried out at a temperature from about −60° C. to about 100° C., more preferably from about 70° C. to about 90° C.

In one embodiment, the esterification step/reaction is carried out at a temperature from about −60° C. to about 100° C., more preferably from about 70° C. to about 90° C.

In one embodiment, the alkylation step is carried out at a temperature from about −75° C. to about 15° C., more preferably from about −15° C. to about 0° C.

In one embodiment, the esterification step is carried out at a pressure from about 275 mbar to about 630 mbar.

In one embodiment, the molar ratio between the hypophosphorous acid and the alcohol is from about 1:4 to 1:10.

In some embodiment, the reaction with alkylating agent includes use of a co-solvent.

In one embodiment the alkylation step/reaction includes use of a co-solvent.

Co-solvents solvent may include but not limited to n-BuOH, Me-Tetrahydrofuran (THF), Acetonitrile, Methyl tert-butyl ether (MTBE), Dioxane, and dimethylformamide (DMF).

In some embodiment, the alkylation reaction is carried out in polar solvent.

Polar solvent may include but not limited to n-BuOH, Me-Tetrahydrofuran, Tetrahydrofuran, Acetonitrile, Methyl tert-butyl ether, Dioxane, and dimethylformamide.

In some embodiments, the reaction with alkylating agent includes a chelating agent and one or more phase transfer agents.

In one embodiment the alkylation step/reaction includes a chelating agent and one or more phase transfer agents.

Examples of chelating agents and phase transfer agents useful herein include, without limitation, one or more of Bu$_4$NX, MeNBu$_3$X, Aliquat® 336, Oct$_4$NX, Oct$_3$NMeX, Me$_4$NX, Ph$_4$PX, PEG-400, and 18-crown-6, where X=Cl, Br, I, or HSO$_4$.

In one embodiment, glufosinate is obtained by hydrolysis, esterification, or alkylation of the compound (II) to obtain glufosinate.

In yet another embodiment, the product of any of the disclosed processes can be isolated from the reaction mixture by any conventional techniques well-known in the art. Such isolation techniques can include, without limitation, one or more of the following: concentration, extraction, precipitation, cooling, filtration, crystallization, and centrifugation, followed by drying.

In yet another embodiment, the product of any of the disclosed processes can be optionally purified by any conventional techniques well-known in the art. Such purification techniques may include, without limitation, one or more of the following: precipitation, crystallization, slurrying, washing in a suitable solvent, filtration through a packed-bed column, dissolution in an appropriate solvent, and re-precipitation by addition of a second solvent in which the compound is insoluble, or any combination thereof.

The following examples illustrate the practice of the present subject matter in some of its embodiments but should not be construed as limiting the scope of the present subject matter. Other embodiments will be apparent to one skilled in the art from consideration of the specification and examples. It is intended that the specification, including the examples, is considered exemplary only, without limiting the scope and spirit of the present subject matter.

EXAMPLES

Example 1: One-Pot Esterification-Alkylation Synthesis

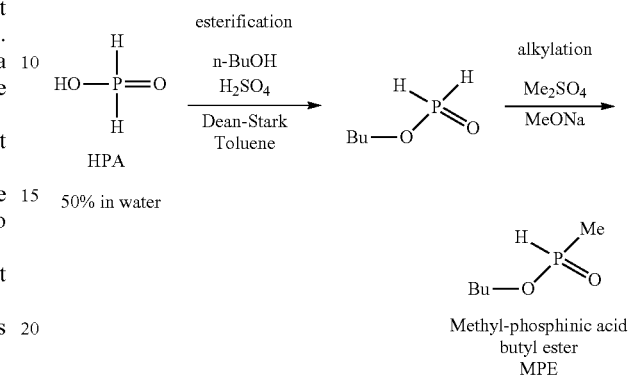

Methyl-phosphinic acid butyl ester
MPE

Esterification Reaction:

Hypoposphorous acid [HPA] (51.3% w/w in water) 48.0 g (0.374 mole, 1.0 eqv.), n-Butanol 123.0 g (173 mole, 4.63 eqv.), 246 ml Toluene and 0.192 g Sulfuric acid were mixed and refluxed under vacuum, with continuous water removal by Deane-Stark apparatus for 12 hours. The end of reaction is indicated by discontinuation of water separation and ratio >1 where $$\text{ratio} = \frac{\text{Area of sample}}{\text{Weight sample (mg)}}.$$

The area of sample is taken from GC chromatogram. The weight of a sample range is about 600-800 mg.

The next step (alkylation) is performed directly in the same reaction vessel.

Alkylation Reaction:

Under an atmosphere of dry-N$_2$ gas, 34.1 g (0.271 mole, 1.5 eqv.) of dimethyl sulfate were added into the reaction vessel. The reaction mixture was cooled to −10° C., and the suspension of sodium methoxide 26.7 g (0.469 mole, 1.3 eqv.), prepared in 267 ml toluene was added in portions between −5 to −10° C. Following the addition, the reaction mixture was kept for additional 30 minutes at −5° C. Water (80 ml) was added dropwise into stirred reaction mixture, keeping the temperature between −5 to 0° C. The obtained two layers were separated. The water layer was extracted with 3×80 ml=240 ml toluene. The residual water in the combined organic phase was removed by Deane-Stark azeotropic distillation at reduced pressure, keeping the temperature in the reaction mixture below 30° C., until the water content became less than 0.4%.

The reaction mixture was concentrated in a rotor-evaporator under vacuum (10 mbar) at 30° C. The concentrate was fractionally distilled using vigreux column, under reduced pressure (8 mbar):1-fraction (fore run) at 48° C. (in distillation mixture); 2-fraction (product) at 71-81° C. (in vapors). The residue product was obtained as colorless liquid with GC; purity >90%.

The isolated yield of MPE=40% (from HPA).

Example 2: Protection-Alkylation-Esterification Synthesis

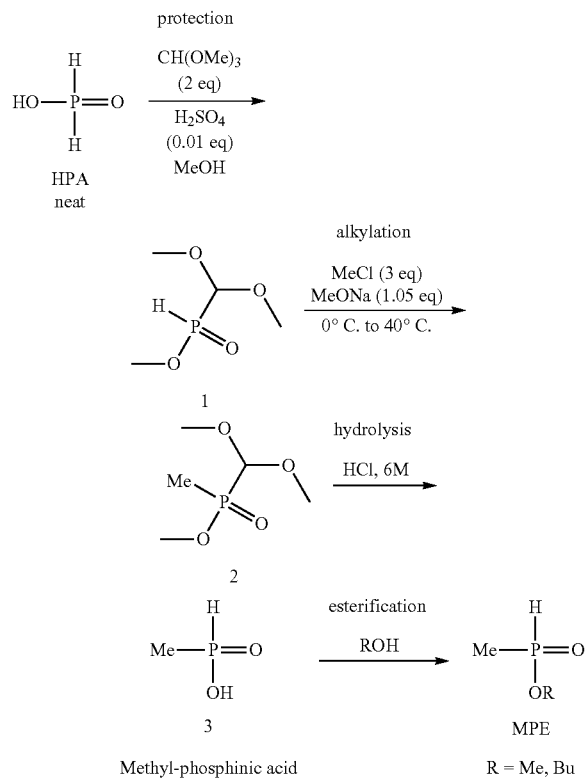

Methyl-phosphinic acid    R = Me, Bu

Preparation of MPE [Butyl Methanephosphinite] from Neat HPA [Hypophosphorous Acid]
First Step Procedure [Esterification/Protection]:

To a flask containing 5 mL of methanol a drop of fuming sulfuric acid was added (~0.05 g) followed by 4.0 g of anhydrous HPA. The resulting solution was stirred for 30 min. before trimethyl orthoformate [TMOF] (12.7 g) was added via a syringe. The reaction mixture was stirred at RT for 3 h. $^{31}$P NMR spectra of the crude reaction mixture indicated full conversion of the starting material and presence of 92% of main product 1 (methyl(dimethoxymethyl)-H-phosphinate).

Second Step Procedure [Alkylation]:

After methyl(dimethoxymethyl)-H-phosphinate 1 had been prepared, all volatiles were removed in high vacuum at room temperature (22° C.) for 3 h. Then THF (0.2 mL) was added and the reaction vessel was cooled with liquid nitrogen. MeCl (3 equiv.) was condensed into the flask, solid MeONa (1.05 equiv.) was added in one portion. The reaction vessel was sealed with a Teflon tap and allowed to warm to room temperature. Shortly after cooling was discontinued, white precipitate appeared, and the reaction mixture was warmed to 30-40° C. by exothermic reaction. Stirring was continued for 16 h at room temperature and the reaction mixture was analyzed by $^{31}$P NMR, which indicated virtually quantitative conversion of H-phosphinate 1 into the target methylated product 2 and 92-94% purity.

Third Step Procedure [Hydrolysis]:

Methyl(dimethoxymethyl)methylphosphinate (2, 0.3 g) was heated to reflux in concentrated 6M HCl (0.5 mL) for 1 h. $^{31}$P NMR indicated full hydrolysis of starting material and formation of 3 in 96% yield.

Fourth Step Procedure [Esterification]:

The reaction mixture after hydrolysis step was diluted with alcohol [methanol or n-butanol] (up to 1:10) and toluene was added (twice of the amount of alcohol). The resulting mixture was refluxed with a Dean-Stark apparatus for up to 8 h. The corresponding methyl ester was obtained in 20% yield, while n-butyl ester MPE was obtained in 70% yield

Example 3: Two-Pot Esterification-Alkylation Synthesis

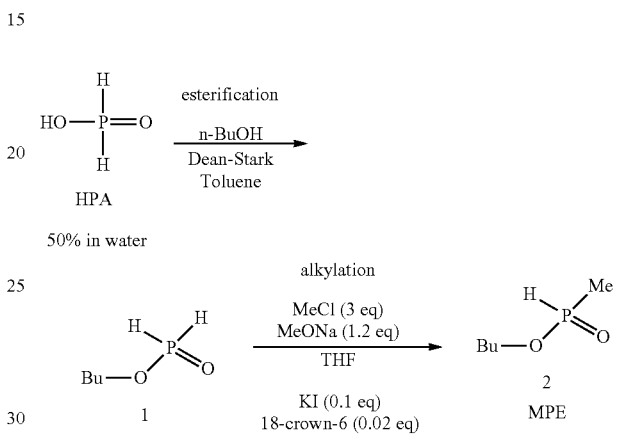

Preparation of MPE [Butyl Methanephosphinite] from HPA [Hypophosphorous Acid] 50% in Water.
First Step Procedure [Esterification]:

A two-neck round-bottom flask was equipped with a rubber septum, a magnetic stirrer and a Dean-Stark head with a condenser and argon inlet on top. The flask was charged with 50% aqueous solution of hypophosphorous acid (19.8 g, 0.15 mol, 1 equiv.), n-butanol (55 mL, 0.6 mol, 4 equiv.) and Toluene (100 mL), and the rubber septum was replaced with a glass stopper. The reaction mixture was heated to reflux over 4 h. It was then cooled to room temperature, the Dean-Stark apparatus was replaced with a stopper and the obtained solution was placed into the refrigerator. $^{31}$P NMR indicated 90% yield of butyl H,H-phosphinate 1 with about 10% of starting material (HPA) still remaining in the mixture.

Second Step Procedure [Alkylation]:

The stock (PhMe/n-BuOH) solution of butyl H,H-phosphinate 1 (37.0 ml, ~36 mmol, 1 equiv.) was concentrated in vacuo (0.05 mmHg) at an ambient temperature over 2 h. The residue was dissolved in dry THF (20 mL) and KI (0.60 g, 0.1 equiv.) was added into the reaction vessel followed by 18-crown-6 (0.19 g, 0.02 equiv.). The resulting mixture was then cooled to −80° C. and MeCl (5.5 g, 3 equiv.) was condensed into the flask. The reaction mixture was warmed to −50° C. and suspension of MeONa (0.32 g, 1.2 equiv.) in 20 mL of THF was added in one portion. The resulting mixture was sealed and left stirring overnight (it took ~3-4 h for the mixture to warm to 0° C.). Next day (after ~18 h) reaction flask was cooled to −20° C. in order to reduce the excessive pressure of MeCl and an aliquote was taken for NMR measurements. The reaction was then quenched by adding sat. aq. NH$_4$Cl (10 mL) and water (10 mL). The aqueous layer was separated and extracted with ether (15 mL). Combined organic extracts were washed with sat. aq.

NaHCO$_3$ (2×15 mL) and brine (15 mL) and dried over MgSO$_4$. After 2 hours, the solid was filtered and thoroughly washed with ether. The ethereal solution was concentrated in vacuo (20 mmHg) and co-evaporated with n-pentane several times in order to remove traces of solvents. The resulting crude product was obtained as a pale yellow liquid (4.15 g). $^{31}$P NMR indicated 48% yield of MPE.

Second Step Alternate Procedure [Alkylation]:

After methyl(dimethoxymethyl)-H-phosphinate 1 had been prepared, all volatiles were removed in high vacuum at room temperature (22° C.) for 3 h. Then THF (0.2 mL/1 mmol) was added and the reaction vessel was cooled with liquid nitrogen. MeCl (3 equiv.) was condensed into the flask, solid MeONa (1.05 equiv.) was added in one portion. The reaction vessel was sealed with a teflon tap and allowed to warm to room temperature. Shortly after cooling was discontinued, white precipitate appeared and the reaction mixture was warmed to 30-40° C. by exothermic reaction. Stirring was continued for 16 h at room temperature and the reaction mixture was analyzed by $^{31}$P NMR, which indicated virtually quantitative conversion of H-phosphinate 1 into the target methylated product 2 and 92-94% purity.

Example 4:
Esterification-Alkylation-Reesterification

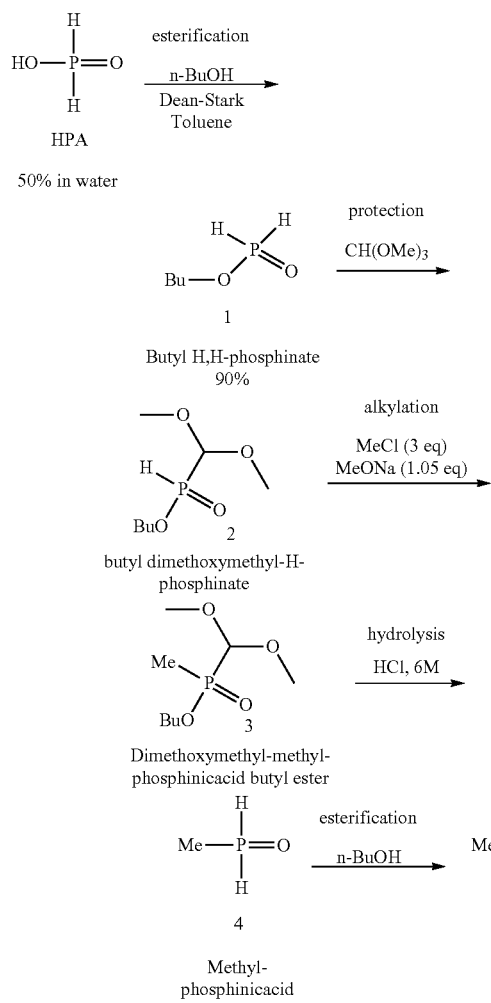

Preparation of MPE [Butyl Methanephosphinite] from HPA [Hypophosphorous Acid] 50% in Water.

First Step Procedure [Esterification]:

A two-neck round-bottom flask was equipped with a rubber septum, a magnetic stirrer and a Dean-Stark head with a condenser and argon inlet on top. The flask was charged with 50% aqueous solution of hypophosphorous acid (19.8 g, 0.15 mol, 1 equiv.), n-butanol (55 mL, 0.6 mol, 4 equiv.) and Toluene (100 mL), and the rubber septum was replaced with glass stopper. The reaction mixture was heated to reflux over 4 h. It was then cooled to room temperature, Dean-Stark apparatus was replaced with stopper and the obtained solution was placed into the refrigerator. $^{31}$P NMR indicated 90% yield of butyl H,H-phosphinate 1 with about 10% of starting material (HPA) still remaining in the mixture.

Second Step Procedure [Protection]:

To a flask containing (PhMe/n-BuOH) solution of butyl H,H-phosphinate 1 (70.0 ml, 0.07 mol, 1 equiv.), under an atmosphere of dry-N$_2$ gas, trimethyl ortho formate [TMOF] (12 g, 1.6 eq) were added via a syringe. The reaction mixture was stirred at r.t. for 10 h. $^{31}$P NMR spectra of the crude mixture showed complete conversion of butyl H,H-phosphinate 1 into the target material butyl dimethoxymethyl-H-phosphinate 2 and 94% purity.

Third Step Procedure [Alkylation]:

After butyl(dimethoxymethyl)-H-phosphinate 2 had been prepared, all volatiles were removed in high vacuum at room temperature (24° C.) for 4 h. The residue was dissolved in dry THF (40 mL) and the reaction vessel was cooled with liquid nitrogen. MeCl (3 equiv.) was condensed into the flask and solid MeONa (1.05 equiv.) was added in one portion. The reaction vessel was sealed with a Teflon tap and allowed to warm to room temperature. Shortly after cooling was discontinued, white precipitate appeared and the reaction mixture was warmed to 30-40° C. by exothermic reaction. Stirring was continued for 16 h at room temperature and the reaction mixture was analyzed by $^{31}$P NMR, which indicated virtually quantitative conversion of H-phosphinate 2 into the target methylated product 3 and 93% purity.

Fourth Step Procedure [Hydrolysis]:

Dimethoxymethyl-methyl-phosphinic acid butyl ester (3, 13 g) was heated to reflux in concentrated 6M HCl (50 mL) for 1 h. 3'P NMR indicated full hydrolysis of starting material and formation of Methyl-phosphinic acid 4 in 96% yield.

Fifth Step Procedure [Esterification]:

The reaction mixture after hydrolysis step was diluted with n-butanol (70 ml) and toluene was added (twice of the amount of alcohol). The resulting mixture was refluxed with a Dean-Stark apparatus for up to 8 h. The corresponding butyl ester MPE was obtained in 65% yield Example 5: Synthesis of Glufosinate from MPE Glufosinate ammonium is prepared from methyl-phosphinic acid butyl ester (MPE) by the following general scheme:

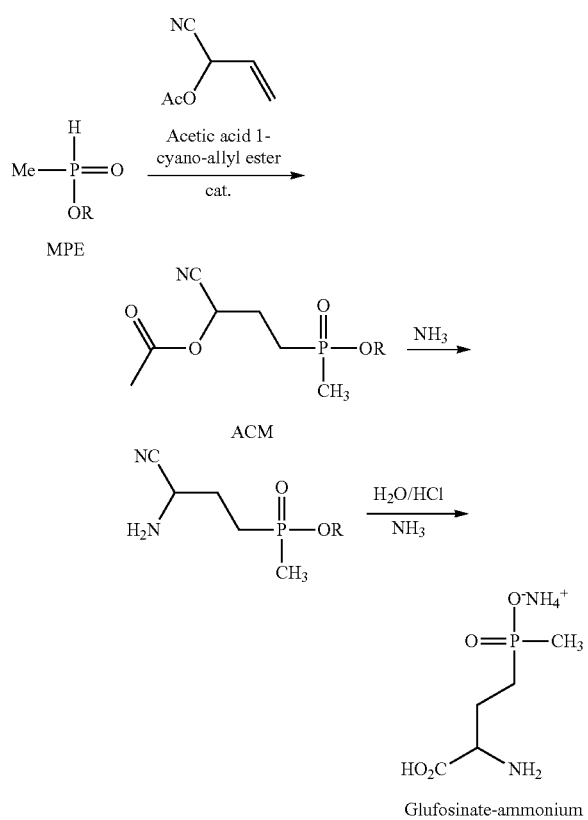

First, MPE reacts with acrolein cyanhydrin acetate (see, for example, EP0011245, U.S. Pat. Nos. 4,521,348, 4,599, 207) and then, the obtained product ACM is further reacted with ammonia, followed by acidic hydrolysis and formation of ammonium salt product.

While the present subject matter has been shown and described with reference to preferred embodiments thereof, it will be understood by those skilled in the art that many alternatives, modifications and variations may be made thereto without departing from the spirit and scope thereof. Accordingly, it is intended to embrace all such alternatives, modifications, and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference.

DISCUSSION

There is a need to develop an improved synthetic process for producing the methyl-phosphinic acid alkyl ester intermediate which is useful in synthesizing the herbicide glufosinate.

All mentioned routes have the same common starting material—HPA, which is cheap, very common and easy to handle (50% in water solution).

The process described herein is based on the cheap commercially available and simple starting materials, utilizing convenient and straight forward synthetic route without a need for sophisticated equipment. The proposed synthesis could be easily applied in the manufacturing of Glufosinate at the industrial scale. The process described here is environmentally advantageous due to minimization of wastes production and their treatment. The reagents utilized in the described process are very easy to handle, thus reducing the hazards at the manufacturing facilities and reducing the required economic investment for handling hazardous chemicals at plant. It has been found that the synthesis of methyl-phosphinic acid alkyl ester by a process of the present invention can significantly improve the conversion and isolated yield of the desired product.

Using the non-polar solvent in the one-pot esterification-alkylation synthesis is very effective because the synthesis starts from a cheap and easy-to-handle solution of HPA in water. In this manner, there is no need to prepare the instable and hazardous neat HPA. The water is removed azeotropically in the course of the reaction and the reaction proceeds smoothly. There is no need to isolate the product of the first esterification step, and the alkylation step is performed in the same vessel, using the same solvent system. The recovery of the mentioned solvents can be performed very easily, thus reducing the production cost.

The reactions involved in the described routes are easy to perform, not requiring any sophisticated equipment. The described processes can be easily scaled up to the manufacturing scale. Synthesized intermediates and their mixtures are relatively non-hazardous and are convenient in handling.

REFERENCES

U.S. Pat. No. 9,035,083 B2, issued May 19, 2015 (Montchamp et al.);
U.S. Pat. No. 6,815,558 B1, issued Nov. 9, 2004 (Weferling et al.);
U.S. Pat. No. 6,806,383 B1, issued Oct. 19, 2004 (Weferling et al.);
U.S. Pat. No. 5,734,072 A, issued Mar. 31, 1998 (Kleiner);
U.S. Pat. No. 4,599,207, issued Jul. 8, 1986 (Lachhein et al.);
U.S. Pat. No. 4,521,348, issued Jun. 4, 1985 (Finke et al.);
European Patent No. EP 0011245 B1, granted Sep. 14, 1983 (Hoechst Aktiengesellschaft);
Chinese Patent Application Publication No. CN102351900 A, published Feb. 15, 2012 (JIANGSU YOUTH CHEMICAL CO LTD et al.);
Chinese Patent Application Publication No. CN103435643 A, published Dec. 11, 2013 (PRESAFER QINGYUAN PHOSPHOR CHEMICAL COMPANY LTD).

What is claimed is:

1. A process for preparing the compound of the formula (II)

wherein R is a $C_1$-$C_6$ alkyl or benzyl, and $R_1$ is $C_1$-$C_6$ alkyl, by an alkylation reaction comprising reacting in a non-polar solvent the compound of formula (I)

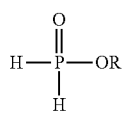

wherein R is $C_1$-$C_6$ alkyl or benzyl,
with an alkylating agent in the presence of a base;
wherein the compound of formula (I) was prepared in the same non-polar solvent and without being isolated from the non-polar solvent prior to reacting with the alkylating agent in the presence of the base,
    wherein the non-polar solvent is one or more of toluene, cyclohexane, xylene, benzene, methyl ethyl ketone, and methyl isobutyl ketone (MIBK); and
wherein the base is one or more of sodium metal, NaOH, $K_2CO_3$, MeONa/MeOH (30% solution), 4-dimethylaminopyridine, diazabicyclo[2.2.2]octane, potassium tert-butoxide, sodium tert-butoxide, Pyridine, 2-Picoline, $Et_3N$, i-$Pr_2$Net, alkyl-OMetal (Metal alkoxide), KH, Alkyl MgX (Grignard reagent), $NaNH_2$, lithium diisopropylamide (LDA), sodium methoxide; sodium hydride and diisobutyl amide salt.

2. The process of claim 1, wherein R is methyl or n-butyl; and/or wherein $R_1$ is methyl.

3. The process of claim 1, wherein the alkylation reaction is carried out in the presence of a polar solvent, wherein the polar solvent is one or more of n-BuOH, Me-Tetrahydrofuran, Tetrahydrofuran (THF), Acetonitrile, Methyl tert-butyl ether, Dioxane, and dimethylformamide (DMF); and
    wherein the alkylating agent is methyl chloride.

4. The process of claim 1 for preparing the compound of the formula (II)

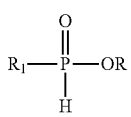

wherein R is $C_1$-$C_6$ alkyl or benzyl, and $R_1$ is $C_1$-$C_6$ alkyl, comprising the steps of:
(a) reacting hypophosphorous acid with a $C_1$-$C_6$ alkyl or benzyl alcohol in the presence of an acid under dehydrating conditions to give the compound of the formula (I),

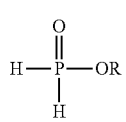

wherein R is $C_1$-$C_6$ alkyl or benzyl; and
(b) reacting the compound of formula (I) obtained in step (a) with the alkylating agent in the presence of the base,
wherein each step is carried out in the same pot in a non-polar solvent, and wherein the product of step (a) is neither purified nor isolated prior to step (b).

5. The process of claim 4, wherein R is methyl or n-butyl, and/or wherein $R_1$ is methyl.

6. The process of claim 4, wherein the non-polar solvent is toluene.

7. The process of claim 4, wherein the alkylating agent is a methylating agent.

8. The process of claim 7, wherein the methylating agent is dimethyl sulfate.

9. The process of claim 4, wherein the base is one or more of sodium methoxide, sodium hydride, and diisobutyl amide salt.

10. The process of claim 4, wherein the compound produced has the structure

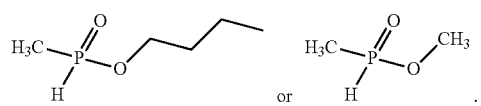

11. The process of claim 4 for preparing the compound of the formula (IIa):

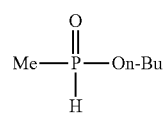

comprising the steps of:
(a) reacting a water solution of hypophosphorous acid with n-butyl alcohol in the presence of sulfuric acid under dehydrating conditions to obtain the compound of the formula (Ia)

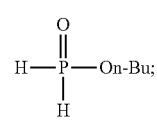

and
(b) reacting the compound obtained in step (a) with dimethyl sulfate in the presence of sodium methoxide,
wherein each step is carried out in toluene, and wherein the product of step (a) is neither purified nor isolated prior to step (b); or
for preparing the compound of the formula (IIb):

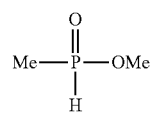

comprising the steps of:
(a) reacting a water solution of hypophosphorous acid with methyl alcohol in the presence of sulfuric acid under dehydrating conditions to obtain the compound of the formula (Ib)

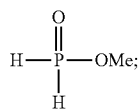
(Ib)

and
- (b) reacting the compound obtained in step (a) with dimethyl sulfate in the presence of sodium methoxide, wherein each step is carried out in toluene, and wherein the product of step (a) is neither purified nor isolated prior to step (b).

12. The process of claim 3, wherein the base is one or more of sodium methoxide, sodium hydride, and diisobutyl amide salt.

13. A process for preparing the compound of the formula (II)

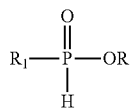
(II)

wherein R is a $C_1$-$C_6$ alkyl or benzyl, and $R_1$ is $C_1$-$C_6$ alkyl, by an alkylation reaction comprising reacting in the compound of formula (I)

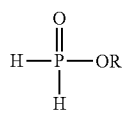
(I)

wherein R is $C_1$-$C_6$ alkyl or benzyl,
with an alkylating agent in the presence of a base;
  wherein the compound of formula (I) is prepared by esterification of hypophosphorous acid in a non-polar solvent, and
  wherein the non-polar solvent is one or more of toluene, cyclohexane, xylene, benzene, methyl ethyl ketone, and methyl isobutyl ketone (MIBK); and
wherein the base is one or more of sodium metal, NaOH, $K_2CO_3$, MeONa/MeOH (30% solution), 4-dimethylaminopyridine, diazabicyclo[2.2.2]octane, potassium tert-butoxide, sodium tert-butoxide, Pyridine, 2-Picoline, $Et_3N$, i-$Pr_2$Net, alkyl-OMetal (Metal alkoxide), KH, Alkyl MgX (Grignard reagent), $NaNH_2$, lithium diisopropylamide (LDA), sodium methoxide; sodium hydride and diisobutyl amide salt.

14. The process of claim 13, wherein $R_1$ is methyl.

15. The process of claim 4, wherein the acid is sulfuric acid.

* * * * *